(12) United States Patent
Zhang et al.

(10) Patent No.: US 11,379,468 B1
(45) Date of Patent: Jul. 5, 2022

(54) CONTROL FLOW GRAPH REFINING VIA EXECUTION DATA

(71) Applicant: International Business Machines Corporation, Armonk, NY (US)

(72) Inventors: Bao Zhang, Beijing (CN); Shi Chong Ma, Beijing (CN); Jin Hong Fu, Beijing (CN); He Huang, BeiJing (CN); Jia Tian Zhong, Beijing (CN); Xing Xing Shen, Beijing (CN); Xiang Zu, Dong Cheng District (CN); Jia Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/318,158

(22) Filed: May 12, 2021

(51) Int. Cl.
*G06F 9/44* (2018.01)
*G06F 16/23* (2019.01)
*G06F 16/901* (2019.01)
*G06F 8/41* (2018.01)

(52) U.S. Cl.
CPC .......... *G06F 16/2365* (2019.01); *G06F 8/433* (2013.01); *G06F 16/9024* (2019.01)

(58) Field of Classification Search
None
See application file for complete search history.

(56) References Cited

U.S. PATENT DOCUMENTS

| 7,900,193 B1 * | 3/2011 | Kolawa ............... G06F 11/3604 717/126 |
| 10,360,004 B2 | 7/2019 | Fan et al. |
| 10,613,842 B2 | 4/2020 | Zhang et al. |
| 10,713,151 B1 * | 7/2020 | Zinger ............... G06F 11/3684 |

(Continued)

FOREIGN PATENT DOCUMENTS

CN 108958851 A * 12/2018

OTHER PUBLICATIONS

Stephan Arlt et. al. "A Theory for Control-Flow Graph Exploration" ATVA, 13, (2013), pp. 1-10.

(Continued)

*Primary Examiner* — Anna C Deng
(74) *Attorney, Agent, or Firm* — Cantor Colburn LLP; Teddi Maranzano

(57) ABSTRACT

Aspects of the invention include computer-implemented method that includes generating a preliminary control flow graph from memory dump data and compiler listing data in response to an exception event at a computing program. Code segments associated with each block of the preliminary control flow graph are translated to Boolean statements. Each Boolean statement is determined to be either satisfied or unsatisfied based on input values retrieved from the memory dump data. An edge property value of a first edge and a second edge of a plurality of edges of the preliminary control flow graph based are calculated based on a satisfaction of the Boolean statements. The edge property value of the first edge is compared to the edge property value of the (Continued)

second edge. The preliminary control flow graph is refined by deleting the first edge of the plurality of edges based at least in part on the comparison.

17 Claims, 9 Drawing Sheets

(56) References Cited

U.S. PATENT DOCUMENTS

| | | | |
|---|---|---|---|
| 2005/0166167 A1* | 7/2005 | Ivancic | G06F 30/3323 |
| | | | 703/22 |
| 2009/0193401 A1* | 7/2009 | Balakrishnan | G06F 9/44589 |
| | | | 717/144 |
| 2015/0149988 A1 | 5/2015 | Nakaike | |
| 2017/0177368 A1* | 6/2017 | DeHon | G06F 21/52 |

OTHER PUBLICATIONS

Myint Myitzu Aung et. al. "Simplifying Control Flow Graphs for Reducing Complexity in Control Flow Testing" IJCTT, vol. 67(8) (2019), pp. 7-12.

IPCOM000262339D "Method for Reducing Control Flow Constructs Using Code Specialization" https://priorart.ip.com/IPCOM/000262339. Published May 20, 2020. 5 pages.

* cited by examiner

```
                                01362 |   *    0 function = 0;    /* Function c
00005E  E380 50D8 0004 001362 |         LG     r8,=A(function)(,
                                001363 |   *    RTOs = "HP64(OFF)";        /
000064  E3A0 50C8 0004 001363 |         LG     r10,=A(RTOs)(,r5,
00006A  E300 6000 0090 001355 |         LLGC   r0,funcflags.BITC
000070  E54C 8000 0000 001362 |         MVHI   function(r8,0),H'
000076  41B0 7028      001363 |         LA     r11,'HP64(OFF).'(
                                001364 |   *    alexmemp = arg2;
00007A  E3C0 5050 0004 001364 |         LG     r12,=A(alexmemp)
```

202 204

200

CONTROL FLOW GRAPH REFINING VIA EXECUTION DATA

BACKGROUND

The present invention generally relates to programmable computing systems, and more specifically, to programmable computing system configured for control flow graph refining via execution data.

Software engineering is a process of using engineering principles to develop and refine software products. Software engineers utilize computing-based tools to evaluate user requirements, design software prototypes, and build the software products.

SUMMARY

Embodiments of the present invention are directed to control flow graph refining via execution data. A non-limiting example computer-implemented method includes generating a preliminary control flow graph from memory dump data and compiler listing data in response to an exception event at a computing program. Code segments associated with each block of the preliminary control flow graph are translated to Boolean statements. Each Boolean statement is determined to be either satisfied or unsatisfied based on input values retrieved from the memory dump data. An edge property value of a first edge and a second edge of a plurality of edges of the preliminary control flow graph based are calculated based on a satisfaction of the Boolean statements. The edge property value of the first edge is compared to the edge property value of the second edge. The preliminary control flow graph is refined by deleting the first edge of the plurality of edges based at least in part on the comparison.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that declutter a control flow graph (CFG) by using system dump data and assembly code listing data to identify and remove code paths from the graph.

Software engineers utilize computing-based error diagnostic tools to assist in the detection of an error and to identify the source of the error. One computing-based error diagnostics tool is a computer generated CFG. A CFG is a computer generated directed graph that provides a graphical representation of the possible paths for computational steps that can be performed during the execution of a computing program. A software engineer can access the CFG and view all the potential computational paths that can occur during the execution of the computing program. In general, the CFG allows a software engineer to statically analyze the code flow through visualization to see the syntactic structures and locate potential errors. For software products that have a long product development history, the CFG continuously incorporates additional paths as the products are modified. The number of code blocks and paths in the CFG becomes too voluminous for visualization to be manageable. Furthermore, the CFG includes all paths whether or not the paths were followed, and as a result, there are code paths that are visualized by the graph, but weren't followed during execution of the program that has crashed. This can become problematic as software engineers need visualization tools to understand the program logic to identify errors.

One or more embodiments of the present invention address one or more of the above-described shortcomings by providing computer-implemented methods, computing systems, and computer program products that retrieve execution data to generate a CFG and generate values for the edges of the CFG. In response to detecting a divergence in a code path from a single path to multiple potential paths, a comparison is performed between edges of the multiple paths. The CFG is refined to eliminate redundant code paths based on the comparison.

Figure 1:
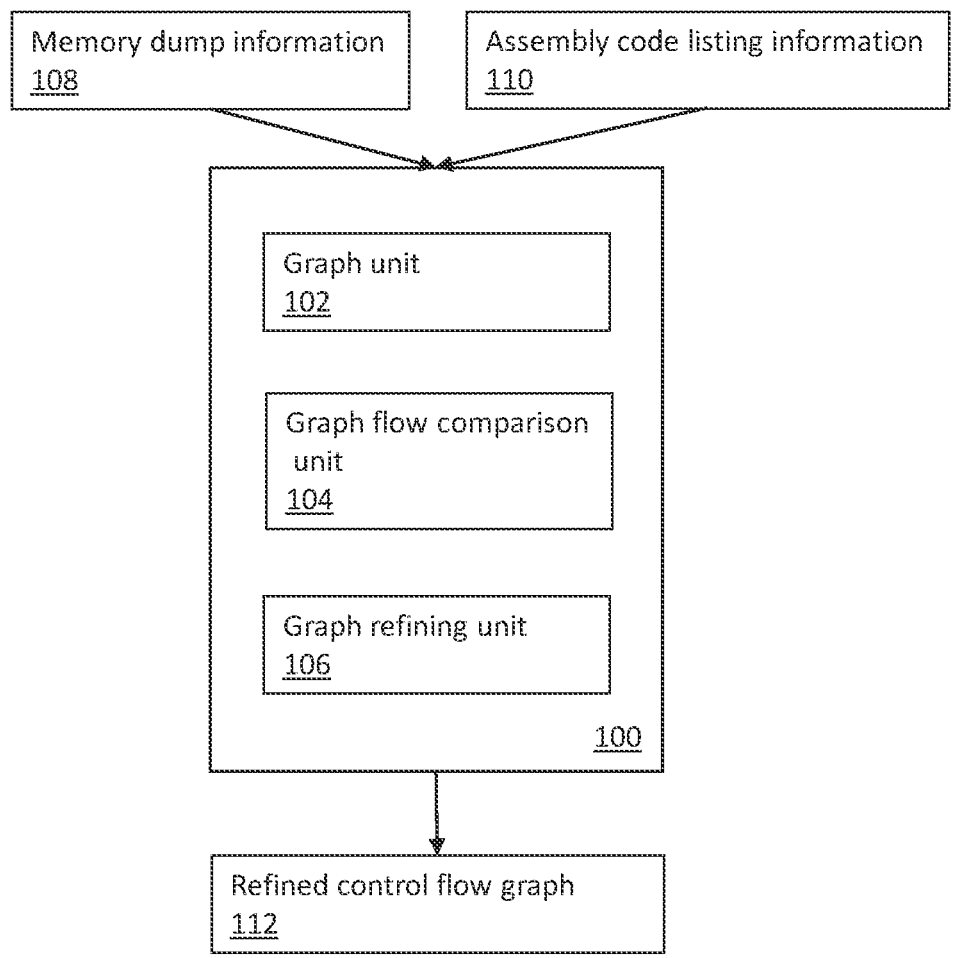
FIG. 1 illustrates a block diagram of components of a system for refining a control flow graph in accordance with one or more embodiments of the present invention.

Turning now to FIG. 1, a system 100 for refining a CFG is generally shown in accordance with one or more embodiments of the present invention. The system 100 includes a graph unit 102 for receiving execution data to build and refine a CFG. The graph unit 102 further calculates values for the edges connecting the blocks of the CFG based on the execution data. The system 100 further includes an edge comparison unit 104 for comparing the different potential code paths based on the edge property values and determining a most likely path. The system 100 further includes a graph refining unit 106 for receiving the comparison outcomes and refining the control flow graph by eliminating potential paths. The system 100 is operable to receive execution data in the form of memory dump information 108 and assembly code listing information 110. The system 100 is further operable to output a refined CFG 112. It should be appreciated that herein described functionality of the system 100 can be performed on a cloud computing node 50 as described by FIG. 7 and/or a processing system 900 as described by FIG. 9.

The graph unit 102 is operable to receive data related to a state of a computing system preceding an exception event (e.g., crash) of a computing system. The data can be, for example, memory dump information 108 and assembly code listing information 110. The graph unit 102 uses data from the memory dump information 108 and assembly code listing information 110 to identify code blocks that were executed before the exception event occurred. For example, the graph unit 102 uses the memory dump information 108 to retrieve register values at the time the exception event occurred. The graph unit 108 can further provision available memory based at least in part on a size of data of the memory dump information 108 and assembly code listing information 110. The graph unit 102 can review the memory dump information 108 and determine the addresses of the code instructions just before the exception occurred. The graph unit 102 reviews the assembly code listing information 110 in conjunction with the memory dump information 108 to determine the corresponding assembly code associated with the source code that was being executed at the time the exception occurred. The graph unit 102 can further review function call tracing information to determine if any functions were called to execution of the assembly code. In the event that a function was called during the execution of the assembly code, the graph unit 102 reviews the system stacks, registers, memory described by the memory dump information 108 to determine any values that transmitted as inputs for the called functions.

The graph unit 102 synthesizes the memory dump information 108 and the assembly code listing information 110 to calculate the blocks and edges of a preliminary CFG. The preliminary CFG is a set of blocks, each associated with a set of instructions, and edges that connect the blocks along different potential code paths. The last block of the preliminary CFG is the last block that was executed prior to an exception event. The graph unit 102 further identifies the blocks as yes blocks, unknown blocks, and original blocks. Yes blocks are CFG blocks that a code path must traverse regardless of any conditional statements associated with the assembly code. Unknown blocks are CFG blocks that may or may not be traversed based on whether a preceding conditional statement is met or not. Original blocks are CFG blocks that are traversed, but can be reached by two or more code paths and each path includes at least one unknown block. In other words, a code path to an original block is based at least in part on which the preceding conditional statement is met.

The graph unit 102 further converts each line of assembly code language into a Boolean statement that can be answered as either true or false based on the statement predicate. For example, a line of assembly code can be translated to the Boolean statement $z \leq 20$. The graph unit 102 can analyze the assembly code listing information 110 and retrieve the values for the variables of the Boolean statements. The graph unit 102 then executes the statement using the retrieved variables as arguments. Based on the execution, the graph unit 102 determines whether the statement is true (satisfied), false (unsatisfied). Using the example above, if the value for the variable z was 20 or less, the statement is true, or if the value for the variable was greater than 20 the statement is false. If, however, the graph unit 102 cannot detect a value for a variable, the statement is unknown. For each statement of the code block, the graph unit 102 determines whether the statement is true, false, or unknown. In some embodiments of the present invention, the graph unit 102 employs a Davis-Putnam-Logemann-Loveland (DPLL) algorithm, which is a backtracking-based search algorithm for determining the satisfiability of each Boolean statement.

The graph unit 102 further determines a property value for each path described by the original block portion of the CFG. Each block of the CFG includes a set of statements that are sequentially executed by a processing system. The CFG blocks are connected by the edges that illustrate paths between the last statement of one block to a first statement of a subsequent block. The graph unit 102 can calculate an edge property value for each based on the satisfiability of each statement of the preceding block. The edge property value is equal to the number of statements that have been satisfied divided by the number of statements that need to be satisfied. For example, consider a block that includes four statements that need to be satisfied prior to proceeding to a subsequent block. In this example, three of the statements are true statements and therefore satisfied. The fourth statement requires variables that were not found by the graph unit 102, and therefore the statement is unknown. Therefore, the edge property value is derived by dividing three (number of satisfied statements) by four (number of statements that need to be satisfied) to reach an edge property value of 0.75. The edge property values are used by the system 100 to determine which edges and blocks to eventually remove from the preliminary CFG.

In some instances, the statements of a CFG block include conditional statement for handling decisions presented by outputted values. Examples of conditional statements include an "if-else" statement. In these instances, a block of a CFG can include more than one path from the final statement that leads to separate blocks. For example, based on the outcome of a conditional statement, a code path may proceed from a first block to a second block or from the first block to a third block. In this instance, a decision is made as to which path to retain and which path to delete. The edge comparison unit 104 identifies a block of the CFG and determines whether one or more preceding blocks have a path to the identified block. If only one preceding block has a path to the identified block, the edge comparison unit 104 identifies another block. If, however, the edge comparison unit 104 determines that more than one block has a path to the identified block, it performs a comparison between the paths. The edge comparison unit 104 performs the comparison by first determining a common block that originates both paths. The edge comparison unit 104 then identifies each path and block that leads from the common block to the identified block.

For example, the edge comparison identifies block A, which has paths 1 and 3 leading into it. Block B is connected directly to block A via path 1. However, block B is also connected to block C via path 3. Block C is connected to block A via path 2. Therefore, block B is a common block that reaches block A via two different paths. The edge comparison unit 104 compares the property edge values of path 1 to the property edge values of paths 2 and 3. As both paths, 2 and 3, have be traversed to go from block B to block C to block A, the edge comparison unit 104 multiplies the property edge value path 3 with the property edge value of path 2.

In some embodiments of the present invention, the edge comparison unit 104 then compares the property edge value of path 1 with the product of the multiplication of the property edge values of paths 2 and 3. The edge comparison unit 104 determines which path and blocks to remove based on the comparison. For example, if the property edge value of path 1 exceeds the product of the multiplication of the property edge values of paths 2 and 3, the edge comparison unit 104 determines paths 2, 3, and block C should be removed. If, however, the property edge value of path 1 is less than the product of the multiplication of the property edge values of paths 2 and 3, the edge comparison unit 104 determines that path 1 should be removed.

In other embodiments of the present invention, the edge comparison unit 104 compares the edge property values to a threshold edge property value. In these embodiments, the edge comparison unit 104 can determine that more than one path can remain. Using the example above, the edge comparison unit 104 that the property edge value of path 1 the product of the multiplication of the property edge values of paths 2 and 3 are both above a threshold value or both below a threshold edge property values based on their respective edge property values. The edges that have edge property values higher than the threshold baseline edge property value and subsequent blocks can be retained. The edges that have edge property values lower than the threshold baseline edge property value and subsequent blocks can be removed. The threshold edge property value can be a baseline threshold edge property value that applies to all edges. In some embodiments of the present invention, the threshold edge property value can be a dynamic value that is individually determined for each edge based on the instructions of two blocks connected to an edge. Certain instructions have higher priority than other instructions, and the edge comparison unit 104 can adjust a threshold value accordingly. For example, the graph unit 102 can have traversed the memory dump information 108 and the assembly code listing information 110 in search of information describing a relative importance of instructions, for example, an indication of a priority interrupt. An instruction that preempts another instruction can be considered a high priority. In response to determining that one of the two blocks connected to an edge includes an instruction that has a high priority, the edge comparison unit 104 can reduce the baseline threshold edge property value for that edge. Additionally, one of the two block may include instructions that have a low priority. Based on the priority interrupt, an instruction that gets preempted by another instruction can be considered a low priority. If one of the two blocks connected to an edge include low priority instructions, the edge comparison unit 104 can increase the baseline threshold edge property value.

The graph refining unit 106 receives the determinations from the edge comparison unit 104 and removes the edges and blocks accordingly. As part of the process, the graph refining unit 106 stores the refined CFG in memory in the memory portion provisioned by the graph unit 102. The graph unit 106 converts the preliminary CFG into a refined CFG 112 in a format suitable for a graph, for example, an adjacency list. The adjacency list is a set of unordered lists that represent the refined CFG 112. Upon storing the refined CFG 112 in the provisioned memory, the graph unit 106 then releases any unused portion of the provisioned memory for use in other computing applications. The graph refining unit 106 then outputs a refined CFG 112 that is more visually manageable for a software developer. In some embodiments of the present invention, the graph refining unit 106 further rearranges the block and edges as visualized by the original CFG to a more visually manageable position. For example, if the graph refining unit 106 can determine a length of a remaining edge from a common block and a length of a removed edge from a common block. If the removed edge has a shorter distance, the graph refining unit 106 can replace the remaining block and edge into the position of the removed block and path.

As used herein, a memory dump, also known as a crash dump or a system dump, is a process in which, in response to an exception event at a computing system (e.g., crash), the computing system records a state of the memory at the time of the crash. The computing system can further cause the information retrieved during the memory dump to be displayed by the computing system. The displayed information can include information related to memory locations, program counters, processor registers, stack pointers, software states, memory management information, and additional crash-related information. The memory dump can be retrieved from a computing system separate from a computing system operated on by a software developer. In this sense, a software developer can analyze and debug a program running on a system that the software developer cannot access.

Figure 2:
FIG. 2 illustrates an assembly code listing in accordance with one or more embodiments of the present invention.

Referring to FIG. 2, an example of an assembly code listing 200 is provided. The assembly code listing 200 includes a sequence of computing code instructions. As seen the assembly code listing 200 includes a location counter 202 that assigns storage addresses for a program's statements. The assembly code listing 200 further includes the accompanying assembly code 204. The assembly code listing 200 provides programmers with a visualization of the relationship between the sequence of source code statements and the translation by a compiler of those source code statements into assembly code. The assembly code listing 200 is also a data structure, by which the graph unit 102 can retrieve information.

Figure 3:
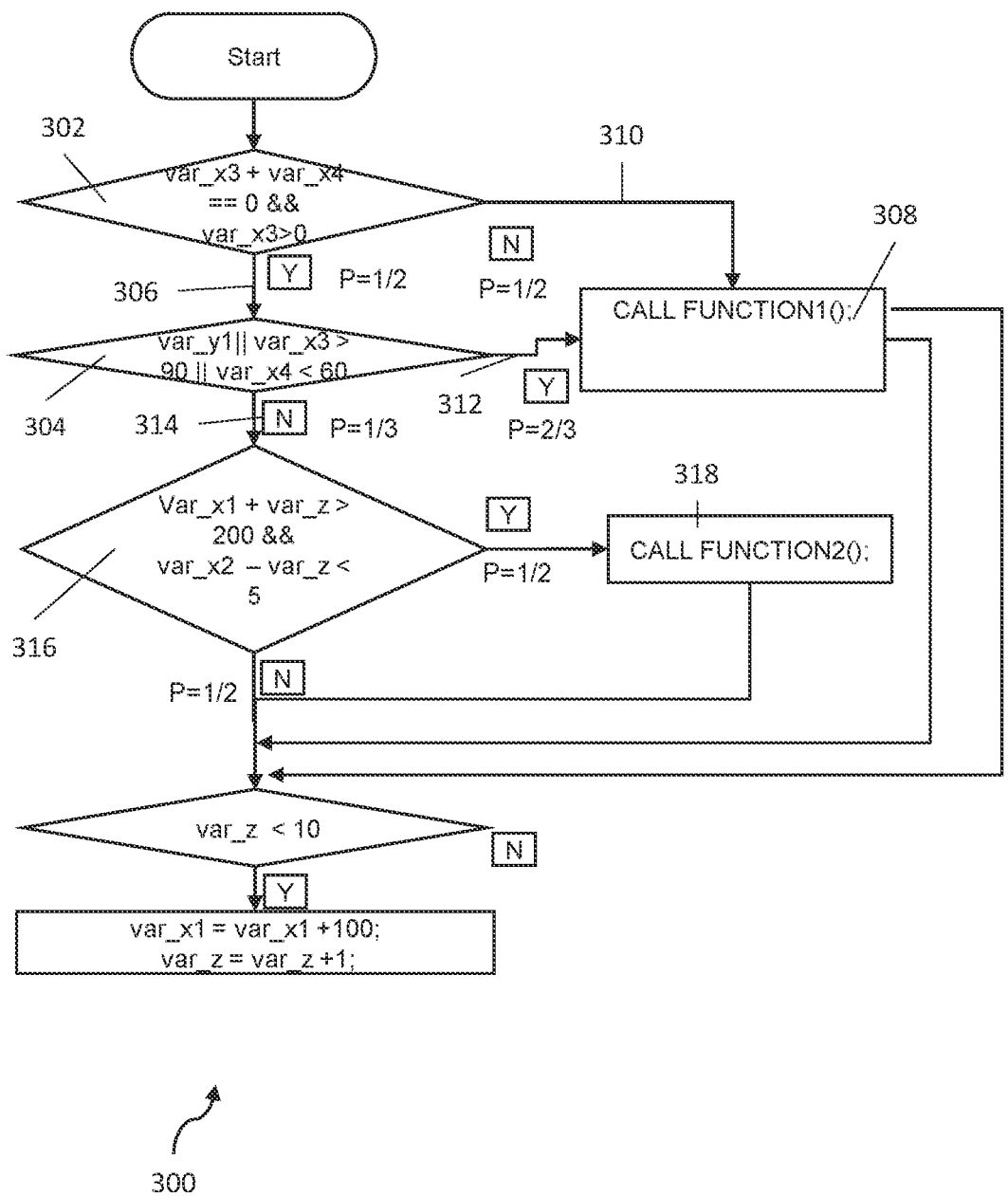
FIG. 3 illustrates a flow diagram of a process for refining a control flow graph in accordance with one or more embodiments of the present invention.
Figure 4:
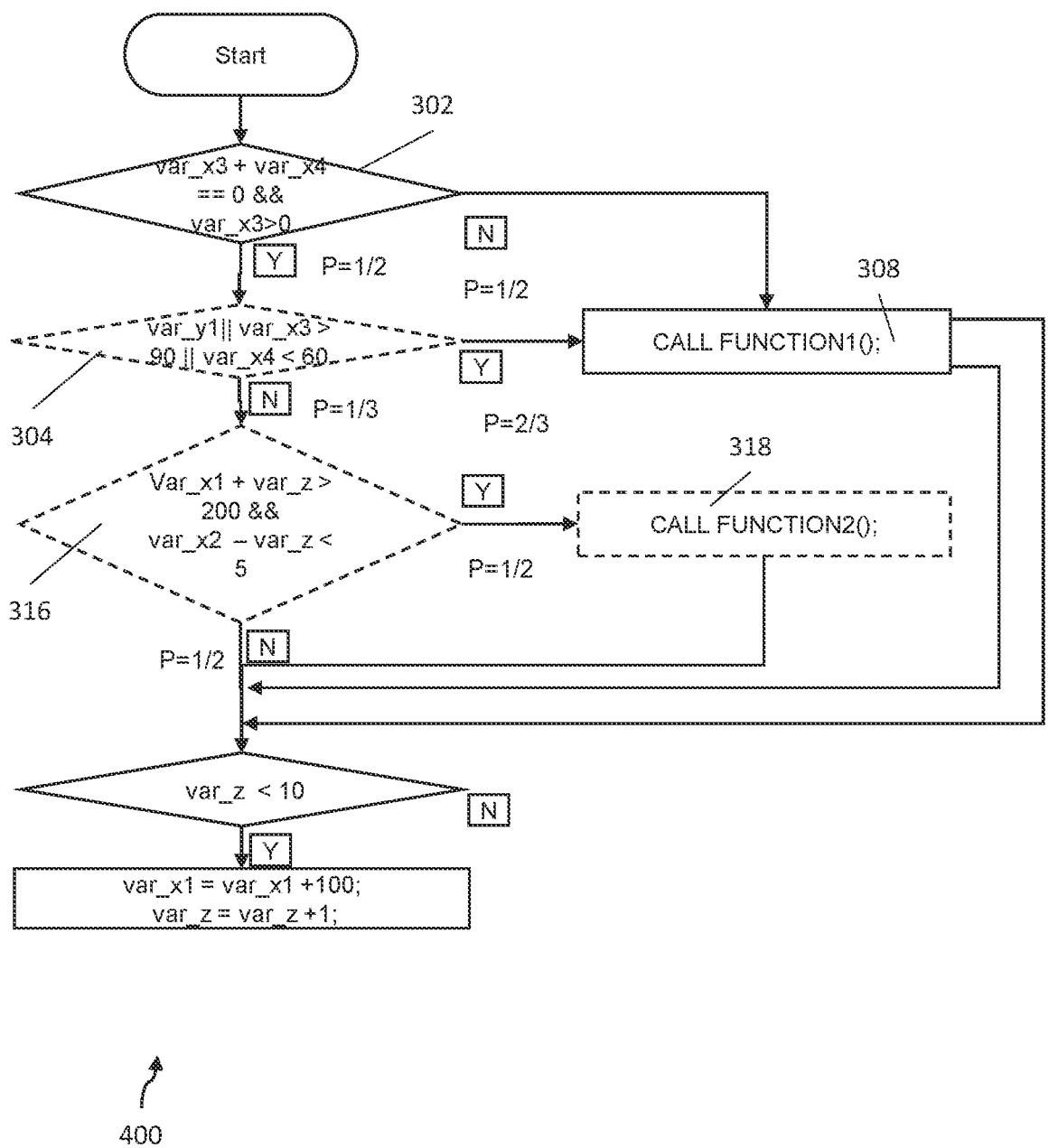
FIG. 4 illustrates a flow diagram of a process for refining a control flow graph in accordance with one or more embodiments of the present invention.
Figure 5:
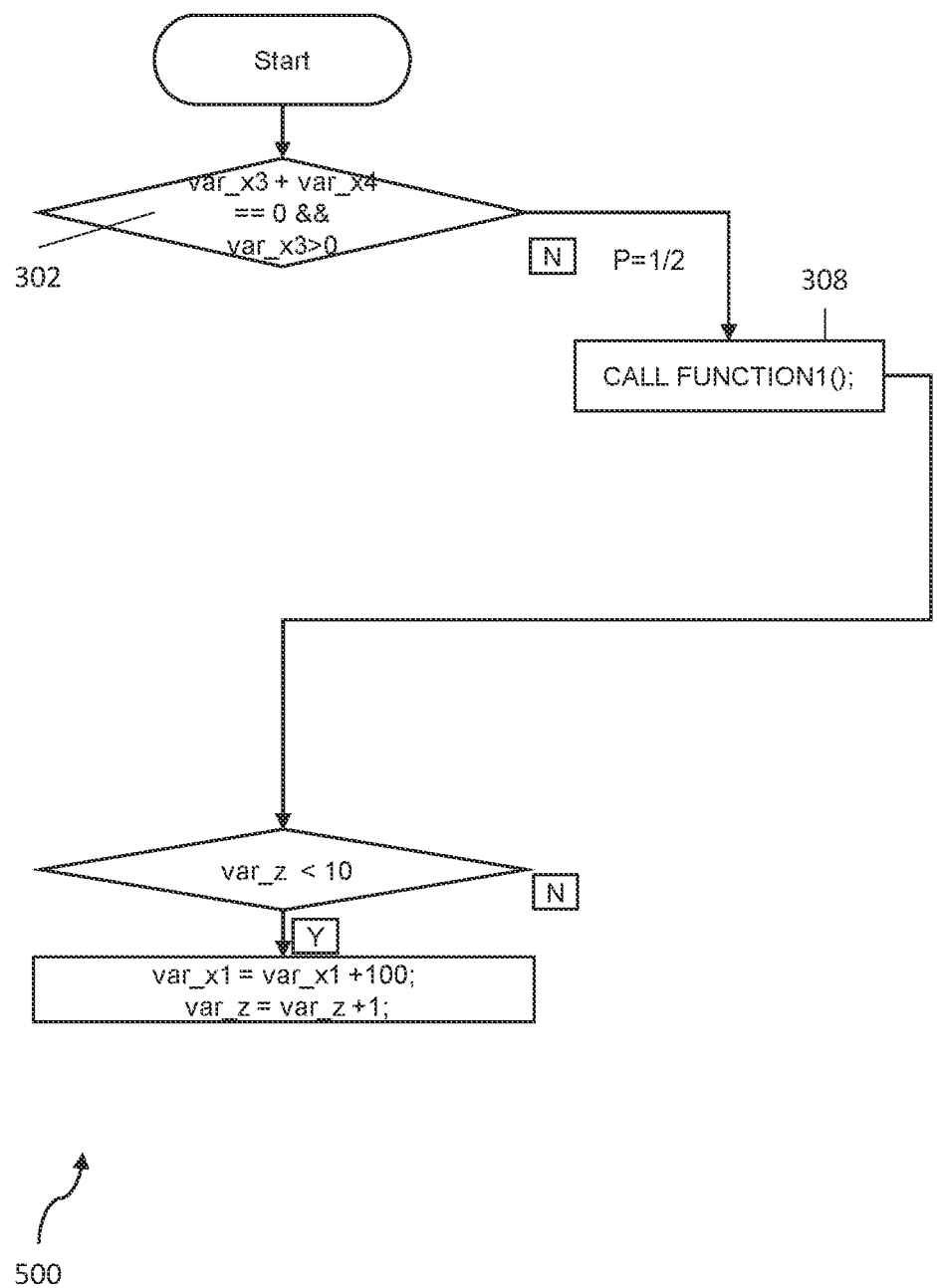
FIG. 5 illustrates a flow diagram of a process for refining a control flow graph in accordance with one or more embodiments of the present invention.

Referring to FIGS. 3, 4, and 5, an illustration of a CFG refining process is shown according to embodiments of the present invention. FIG. 3 illustrates a CFG portion 300 containing eight blocks and ten edges. A first block 302 is connected to a second block 304 via a first edge 306. The first block 302 is also connected to a third block 308 via a second edge 310. The second block 304 is connected to the third block 308 via a third edge 312. The graph unit 102 identifies the third block 308 as an original block (block that has been executed). As illustrated, herein, the third block 308 is a call function block, in which a processing unit called function 1 when executing the assembly code statements of the third block 308. Upon identifying the third block 308, the graph unit 102 detects that both the second edge 310 and the third edge 312 describe respective paths to the third block 308. The graph unit 102 traverses the edges in a reverse direction to determine that the first block 302 is a common block for both paths to the third block 308. The first block 302 includes a conditional statement and therefore, if the condition is met the code flow follows the first edge 306 to the second block 304. If the condition is not met, the code flows follows the second edge 310 to the third block 308.

The code flow path must flow through the first block 302 and therefore the graph unit 102 determines that the first block 302 shall remain in the refined CFG 112. However, the second block 304, a fourth block 316, and a fifth block 318 are unknown as to whether they will remain in the refined CFG 112. To determine which blocks remain in the refined CFG 112, the graph unit 102 calculates the edge property values of the first edge 306, the second edge 310 and the third edge 312 by dividing the number of statements of the first block 302 that need to be satisfied by the total number of statements. The edge property value of the first edge is one-half, and the edge property value of the second edge 310 is also one-half. The edge property values for edges leaving any one block must sum up to one. Therefore, once the graph unit 102 calculates the edge property value of the first edge 306, it can subtract the calculated value from one to obtain the edge property value of the second edge 310 (e.g., 1−½=½). The graph unit 102 then calculates the edge property value of the third edge 312 and subtracts that value from one to obtain the edge property value of a fourth edge 314 (1−⅔=⅓).

The edge comparison unit 104 then compares the edge property values for each path to the third block 308. The second edge 310 from the first block 302 directly connects to the third block 308 and has an edge property value of one-half. The first edge 306 has an edge property value of one-half, and the third edge 312 has an edge property value of two-thirds. As the code flow path from the first block 302 to the second block 304 to the third block 308, it traverses both the first edge 306 and the third edge 312. The edge property value of the first edge 306 is multiplied by the edge property value of the third edge 312 to reach a product value of one third (½*⅔=⅓). The edge comparison unit 104 compares the property edge values of the second edge 310 and the product of the first edge 306 and the third edge 312, and determines that the property edge value of the second edge 310 is greater (½>⅓). Therefore, the edge comparison unit 104 determines that the more likely code flow path is from the first block 302 directly to the third block 308.

Referring to FIG. 4, an illustration of an intermediary step of refining a CFG portion 400, is shown, The edge comparison unit 10 uses the determination that the more likely code flow path is from the first block 302 directly to the third block 308 to identify the second block 304, the fourth block 316 and a fifth block 318 as no blocks. Referring to FIG. 5, a refined CFG portion 500 is illustrated according to embodiments of the present invention. The graph refining unit 106 receives the block categorizations from edge comparison unit 104 and removes the no blocks (second block 304, the fourth block 316, the fifth block 318), and any edges associated with the no blocks. As seen in FIG. 5, the refined CFG portion includes five blocks and four edges, which is more visually manageable than the eight blocks and ten edges of the preliminary CFG portion 300. By making the CFG more visually manageable to enable a developer to recognize the cause of an exception event. Reducing the number of blocks and edges also reduce the memory constraints on a computing system. The memory addresses that contained the data describing the deleted blocks and edges can be allocated to store data for different computing functions. In fact in some embodiments of the present invention, in response to generating the refined CFG portion 500, the system 100 can erase the data stored in the data memory addresses that described the deleted blocks and edges.

Figure 6:
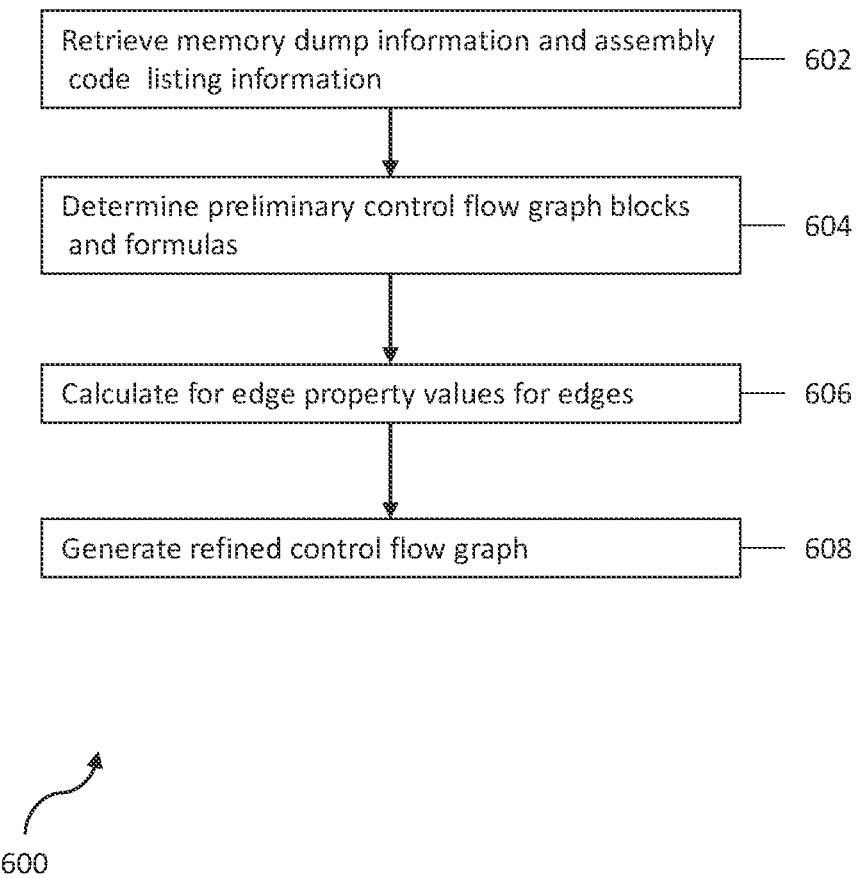
FIG. 6 illustrates a flow diagram of a process for refining a control flow graph in accordance with one or more embodiments of the present invention.

Referring to FIG. 6, a flow diagram 600 of a process for refining a CFG in accordance with one or more embodiments of the present invention. It should be appreciated that all or a portion of the processing shown in FIG. 6 can be performed by a computer system, such as system 100 of FIG. 1. At block 602, a graph unit 102 can retrieve memory dump information 108 and assembly code listing information 110 based at least in part on the detection of an exception event. Upon detecting the exception event, the graph unit 102 can execute a command to retrieve the memory dump information 108 and the assembly code listing information 110 from the computing system that generated the exception event.

At block 604, the graph unit 102 analyzes the memory dump information 108 and the assembly code listing information 110, and calculates the blocks and edges for a preliminary CFG. The graph unit 102 further translates the statements associated with each block as Boolean statements. The graph unit 102 then analyzes the memory dump information to retrieve any variables that may be used as arguments for the Boolean statements, such that the Boolean statements are either true or false depending on whether the variables satisfy the Boolean statement or not.

At block 606, the graph unit 102 further calculates edge property values for each edge of the preliminary CFG. The edge property values are calculated based on the quotient of the number of true statements of the block immediately preceding a block divided by the total number of statements. The graph unit 102 calculates the edge property values in a forward direction, beginning from the start of a code flow as defined by the CFG to an end of code flow as defined by the CFG.

At block 608, an edge comparison unit 104 identifies each block that includes a conditional statement, such that the code flow path diverges at the block to two or more potential code flow paths. The edge comparison unit 104 compares the edge property values associated with the edges of each path and selects the edge with the higher edge property value. The selection of edge moves in a forward direction from the start of the code flow. Using this process, the edge comparison unit 104 identifies a code path with edges having the higher edge property values. A graph refining unit 106 then deletes the edges and blocks associated with the edges having lower edge property values.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
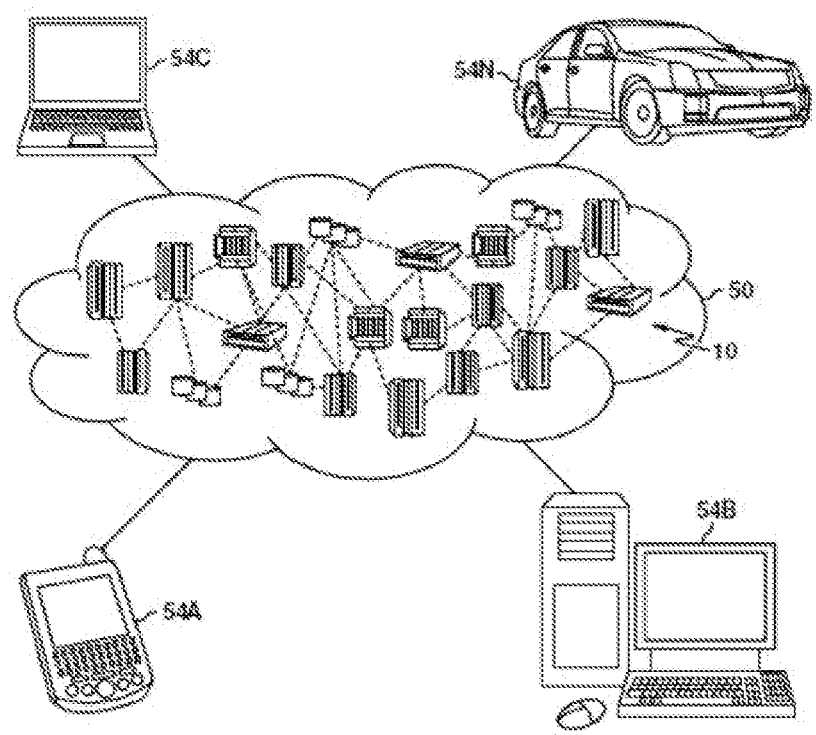
FIG. 7 illustrates a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
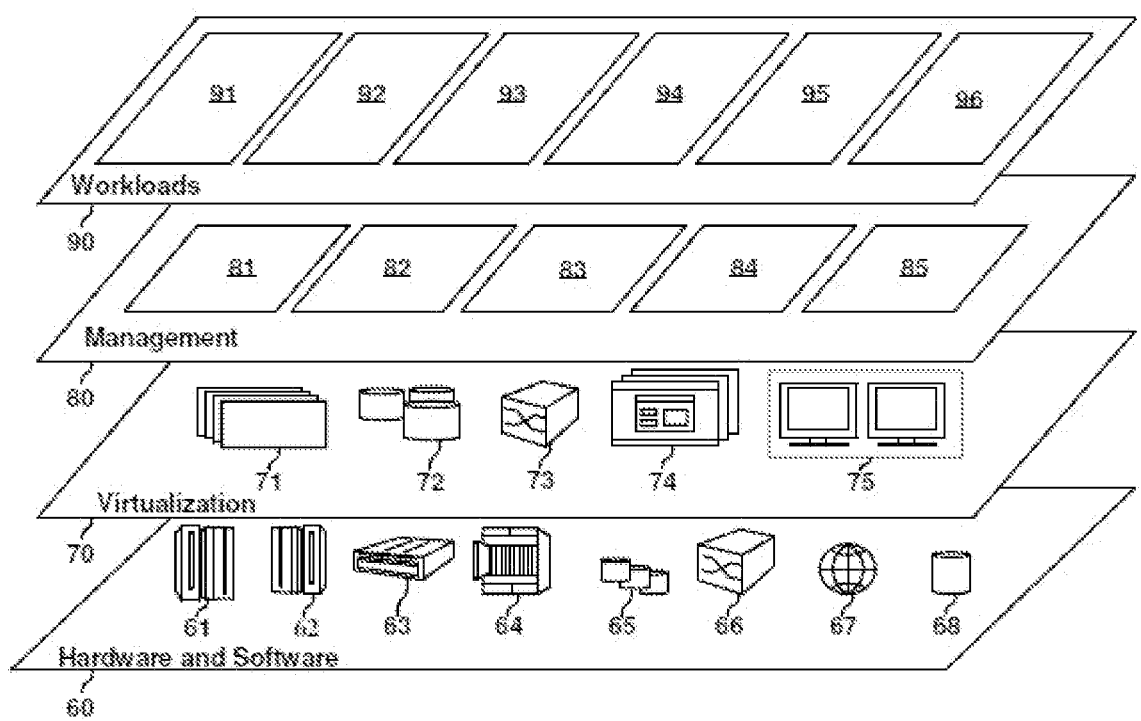
FIG. 8 illustrates abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and refining a control flow graph (CFG) 96.

Figure 9:
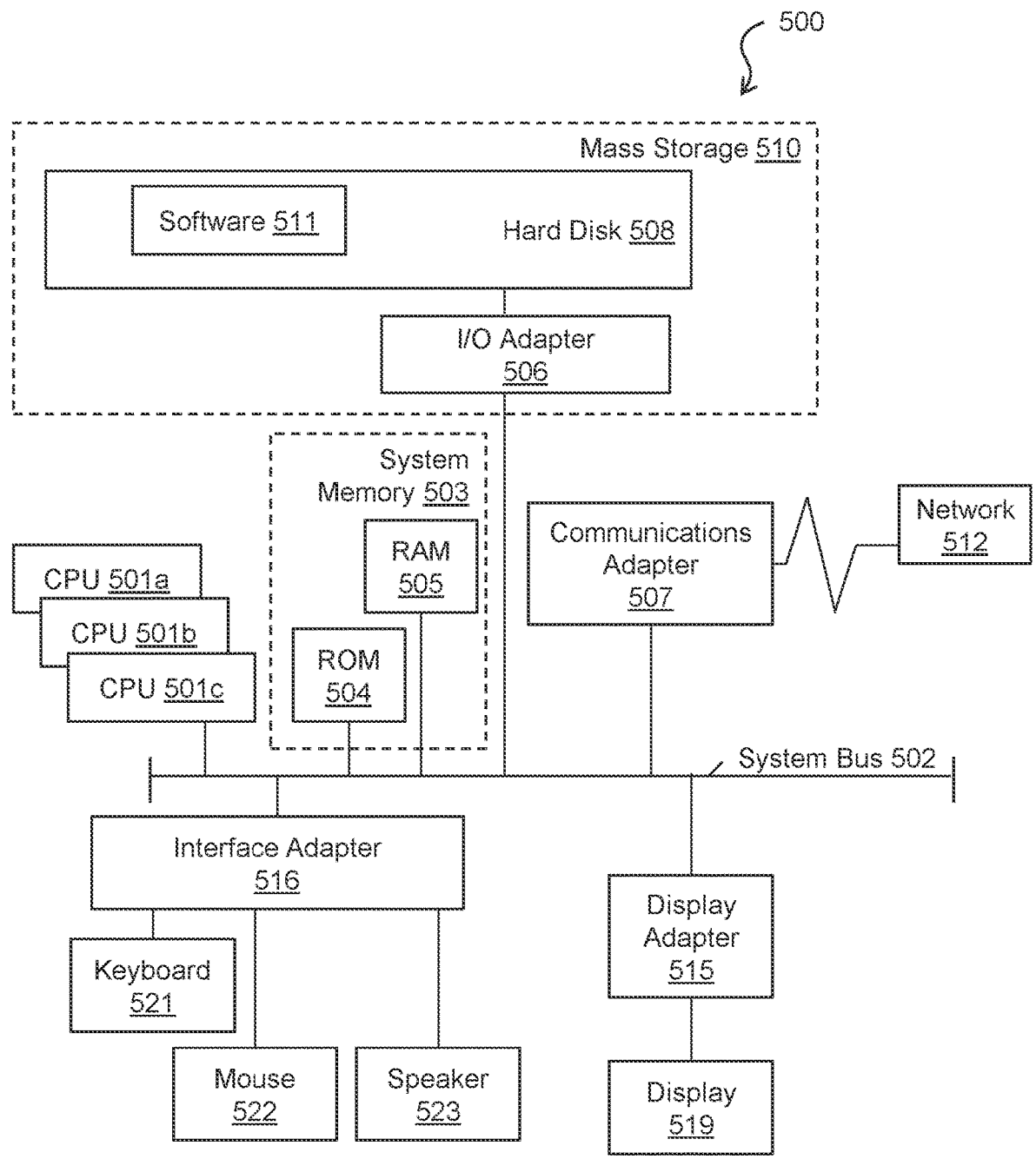
FIG. 9 illustrates a block diagram of a computer system for use in implementing one or more embodiments of the present invention.

In one or more embodiments of the present invention, the hardware/software modules in the system 100 from FIG. 1 can be implemented on the processing system 900 found in FIG. 9. Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 901). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AIX operating system from IBM Corporation, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 500 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating, by a processor, a preliminary control flow graph from memory dump data and compiler listing data in response to an exception event at a computing program;
   translating, by the processor, code segments associated with each block of the preliminary control flow graph to Boolean statements;
   determining, by the processor, whether each Boolean statement is satisfied based on input values retrieved from the memory dump data;
   calculating, by the processor, an edge property value of a first edge and an edge property value of a second edge of a plurality of edges of the preliminary control flow graph based on a satisfaction of the Boolean statements;
   comparing, by the processor, the edge property value of the first edge and the edge property value of the second edge, wherein the first edge and the second edge are both connected to a common block;

determining, by the processor, the edge property value of the first edge is less than the edge property value of the second edge based at least in part on the comparison; and refining, by the processor, the preliminary control flow graph by deleting the first edge of the plurality of edges based at least in part on the determination that the edge property value of the first edge is less than the edge property value of the second edge.

2. The computer-implemented method of claim 1, wherein calculating the edge property value for the first edge comprises:

retrieving input values for each Boolean statement of a first block of the control flow graph from the memory dump, wherein the first block is connected to the first edge and the second edge;

inputting a respective input value into each Boolean statement to determine whether each Boolean statement is satisfied; and dividing a total number of respective satisfied Boolean statements by a total number of Boolean statements.

3. The computer-implemented method of claim 1, further comprising:

determining a last executed instruction by the computing program prior to the exception event from the memory dump information;

identifying a last block of the preliminary control flow graph based on the last block including the last executed instruction; and generating the preliminary control flow graph based on the last block.

4. The computer-implemented method of claim 1, further comprising:

determining each function called by the computing program via a call function trace;

determining each input value inputted into each function and each output value outputted by each function; and determining an edge property value for each function based at least in part on a satisfaction of a respective Boolean statement describing each function.

5. The computer-implemented method of claim 1, wherein the first block comprises a conditional statement.

6. The computer-implemented method of claim 1, further comprising causing the refined control flow graph to be displayed on a computing display.

7. A system comprising:

a memory having computer readable instructions; and one or more processors for executing the computer readable instructions, the computer readable instructions controlling the one or more processors to perform operations comprising:

generating a preliminary control flow graph from memory dump data and compiler listing data in response to an exception event at a computing program;

translating code segments associated with each block of the control flow graph to Boolean statements;

determining whether each Boolean statement is satisfied based on input values retrieved from the memory dump data;

calculating an edge property value of a first edge and an edge property value of a second edge of a plurality of edges of the preliminary control flow graph based on a satisfaction of the Boolean statements;

comparing the edge property value of the first edge and the edge property value of the second edge, wherein the first edge and the second edge are both connected to a common block;

determining that the edge property value of the first edge is less than the edge property value of the second edge based at least in part on the comparison; and refining the preliminary control flow graph by deleting the first edge of the plurality of edges based at least in part on the determination that the edge property value of the first edge is less than the edge property value of the second edge.

8. The system of claim 7, wherein calculating the edge property value comprises:

retrieving input values for each Boolean statement of a first block of the control flow graph from the memory dump, wherein the first block is connected to the first edge and the second edge;

inputting a respective input value into each Boolean statement to determine whether each Boolean statement is satisfied; and dividing total number of respective satisfied Boolean statements by a total number of Boolean statements.

9. The system of claim 7, the operations further comprising:

determining a last executed instruction by the computing program prior to the exception event from the memory dump information;

identifying a last block of the preliminary control flow graph based on the last block including the last executed instruction; and generating the preliminary control flow graph based on the last block.

10. The system of claim 7, the operations further comprising:

determining each function called by the computing program via a call function trace;

determining each input value inputted into each function and each output value outputted by each function; and determining an edge property value for each function based at least in part on a satisfaction of a respective Boolean statement describing each function.

11. The system of claim 8, wherein the first block comprises a conditional statement.

12. The system of claim 7, the operations further comprising causing the refined control flow graph to be displayed on a computing display.

13. A computer program product comprising a computer readable storage medium having program instructions embodied therewith, the program instructions executable by a processor to cause the processor to perform operations comprising:

generating a preliminary control flow graph from memory dump data and compiler listing data in response to an exception event at a computing program;

translating code segments associated with each block of the control flow graph to Boolean statements;

determining whether each Boolean statement is satisfied based on input values retrieved from the memory dump data;

calculating an edge property value of a first edge and an edge property value of a second edge of a plurality of edges of the preliminary control flow graph based on a satisfaction of the Boolean statements;

comparing the edge property value of the first edge and the edge property value of the second edge, wherein the first edge and the second edge are both connected to a common block;

determining that the edge property value of the first edge is less than the edge property value of the second edge based at least on the comparison; and refining the preliminary control flow graph by deleting the first edge of the plurality of edges based at least in part on the determination that the edge property value of the first edge is less than the edge property value of the second edge.

14. The computer program product of claim 13, wherein calculating the edge property value comprises:
retrieving input values for each Boolean statement of a first code block of the control flow graph from the memory dump;
inputting a respective input value into each Boolean statement to determine whether each Boolean statement is satisfied; and
dividing total number of satisfied Boolean statements by a total number of Boolean statements.

15. The computer program product of claim 13, the operations further comprising:
determining a last executed instruction by the computing program prior to the exception event from the memory dump information;
identifying a last block of the preliminary control flow graph based on the last block including the last executed instruction; and
generating the preliminary control flow graph based on the last block.

16. The computer program product of claim 13, the operations further comprising:
determining each function called by the computing program via a call function trace;
determining each input value inputted into each function and each output value outputted by each function; and
determining an edge property value for each function based at least in part on a satisfaction of a respective Boolean statement describing each function.

17. The computer program product of claim 13, wherein the first block comprises a conditional statement.

* * * * *